US012321942B2

(12) United States Patent
Das et al.

(10) Patent No.: US 12,321,942 B2
(45) Date of Patent: *Jun. 3, 2025

(54) SYSTEM, METHOD, AND COMPUTER PROGRAM PRODUCT FOR PREDICTING A SPECIFIED GEOGRAPHIC AREA OF A USER

(71) Applicant: Visa International Service Association, San Francisco, CA (US)

(72) Inventors: Mahashweta Das, Campbell, CA (US); Hao Yang, San Jose, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/773,655

(22) Filed: Jul. 16, 2024

(65) Prior Publication Data

US 2024/0370871 A1   Nov. 7, 2024

Related U.S. Application Data

(63) Continuation of application No. 16/971,798, filed as application No. PCT/US2018/019308 on Feb. 23, 2018, now Pat. No. 12,067,570.

(51) Int. Cl.
*G06Q 20/40* (2012.01)
*G06N 20/00* (2019.01)
(Continued)

(52) U.S. Cl.
CPC ......... *G06Q 20/4015* (2020.05); *G06N 20/00* (2019.01); *G06Q 20/4093* (2013.01); *G06Q 30/0211* (2013.01); *H04W 4/029* (2018.02)

(58) Field of Classification Search
CPC .... G06Q 20/00–425; G06N 20/00–20; H04W 4/00–90
See application file for complete search history.

(56) References Cited

U.S. PATENT DOCUMENTS 10,922,712 B1   2/2021   Langdon
2009/0024546 A1   1/2009   Ficcaglia et al.
(Continued)

FOREIGN PATENT DOCUMENTS

WO   2019083714 A1   5/2019

OTHER PUBLICATIONS

Cadez et al., "Predictive Profiles for Transaction Data using Finite Mixture Models", Technical Report No. 01-67, Department of Information and Computer Science, University of California, Irvine, CA, 37 pages.
(Continued)

*Primary Examiner* — Mohammad A. Nilforoush
(74) *Attorney, Agent, or Firm* — The Webb Law Firm

(57) ABSTRACT

Systems, methods, and computer program products are provided for predicting a specified geographic area of a user. An example system includes a processor configured to determine a verified geographic area associated with each user, and determine a feature vector associated with an account of each user. The processor is also configured to receive transaction data and determine a value of each parameter of the feature vector for each user based on the transaction data to produce a training matrix. The processor is further configured to train and validate a geographic area prediction model based on the training matrix. The processor is further configured to repeatedly generate a prediction that a user will conduct a transaction in a geographic area, communicate an offer to the user based on the prediction, receive new training data, and update the geographic area prediction model based on the new training data.

20 Claims, 7 Drawing Sheets

(51) Int. Cl.
   *G06Q 30/0211*   (2023.01)
   *H04W 4/029*    (2018.01)

(56) References Cited

U.S. PATENT DOCUMENTS

| | | |
|---|---|---|
| 2014/0304212 A1 | 10/2014 | Shim et al. |
| 2014/0326783 A1 | 11/2014 | Burrell |
| 2015/0227934 A1 | 8/2015 | Chauhan |
| 2015/0264532 A1 | 9/2015 | Spears |
| 2016/0117705 A1 | 4/2016 | Robinson et al. |
| 2016/0328610 A1 | 11/2016 | Thompson et al. |
| 2017/0116679 A1 | 4/2017 | Abraham et al. |
| 2017/0262784 A1 | 9/2017 | Lowery et al. |
| 2017/0300948 A1 | 10/2017 | Chauhan et al. |
| 2019/0287125 A1 | 9/2019 | Kumar et al. |

OTHER PUBLICATIONS

Friedman, "Greedy Function Approximation: A Gradient Boosting Machine", The Annals of Statistics, 2001, 39 pages.

Gupta et al., "Training Highly Multiclass Classifiers", Journal of Machine Learning Research, Apr. 2014, pp. 1461-1492.

Li et al., "Predicting Home and Work Locations Using Transport Smart Card Data by Spectral Analysis", 2015 IEEE 18th International Conference on Intelligent Transportation Systems, 2015, pp. 2788-2793.

Mahmud et al., "Home Location Identification of Twitter Users", ACM Transactions on Intelligent Systems and Technology, Jul. 2014, 21 pages, vol. 5, No. 3.

Zheng et al., "Inferring Home Location from User's Photo Collections based on Visual Content and Mobility Patterns", ACM 3rd Multimedia Workshop on Geotagging and Its Applications in Multimedia, 2014, pp. 21-26.

SYSTEM, METHOD, AND COMPUTER PROGRAM PRODUCT FOR PREDICTING A SPECIFIED GEOGRAPHIC AREA OF A USER

CROSS-REFERENCE TO RELATED APPLICATIONS

This application is a continuation of U.S. patent application Ser. No. 16/971,798, effectively filed Feb. 23, 2018, titled "System, Method, and Computer Program Product for Predicting a Specified Geographic Area of a User", which is the United States national phase of International Application No. PCT/US2018/019308, filed Feb. 23, 2018, titled "System, Method, and Computer Program Product for Predicting a Specified Geographic Area of a User", the disclosures of which are hereby incorporated by reference in their entireties.

BACKGROUND

1. Technical Field

This disclosure relates generally to predicting the location or position of a user, and, in non-limiting embodiments or aspects, to systems, methods, and computer program products for predicting a specified geographic area of a user, such as a specific geographic area corresponding to a user associated with a financial payment instrument or account.

2. Technical Considerations

Quickly evolving payment landscapes, as well as the rapidly growing volume of data associated with transaction activity, create the need to better understand a merchant's consumer base in order to drive innovative solutions to the various groups and types of consumers. The current spending data corresponding to an account holder is a powerful predictor of their future spending behavior, which, in turn, can assist merchants to strategically identify and provide beneficial programs and processes to specific consumers or consumer groups. An account holder's demographic data, such as the geographic area of his or her residence, provides valuable insight that allows for the effective creation and implementation of these programs and processes.

However, a financial institution may communicate offers to a user and/or a group of users and the offers may be ineffective at encouraging the user and/or the group of users to conduct a payment transaction using a credit card issued by the financial institution. For example, the offers may be ineffective because the financial institution did not take into consideration that a user did not make purchases at a merchant in a particular merchant category, did not make purchases at a merchant in a particular merchant category during a time interval of a day, is not located in a relevant geographic area, and/or the like. In another example, the offers may be ineffective at encouraging the user and/or the group of users to make a purchase using the credit card because the user and/or the group of users have received so many offers from the financial institution that an offer is ignored. In addition, by communicating offers that are ineffective, network resources may be wasted as compared to communicating fewer offers. There is a need in the art for a means of automatically predicting a specified geographic area of a user to enhance the effectiveness of financial programs and processes.

SUMMARY

Accordingly, provided are improved systems, methods, and computer program products for predicting the geographic area of a user.

According to some non-limiting embodiments or aspects, provided is a method for predicting a specified geographic area of a user. The method includes receiving, with at least one processor, transaction data associated with a plurality of transactions involving a plurality of users and a plurality of merchants during a predetermined time interval. The method also includes generating, with at least one processor, a geographic area prediction model based on the transaction data by (i) determining a verified geographic area of a plurality of geographic areas for each user of the plurality of users, (ii) determining transaction data associated with a plurality of transactions involving each user of the plurality of users for each feature vector parameter of a plurality of feature vector parameters, wherein determining the transaction data includes determining each feature vector parameter of the plurality of feature vector parameters for each geographic area of the plurality of geographic areas, (iii) training the geographic area prediction model based on the plurality of feature vector parameters for the verified geographic area for each user of the plurality of users, and (iv) validating the geographic area prediction model based on the plurality of feature vector parameters for the verified geographic area for each user of the plurality of users.

In some non-limiting embodiments or aspects, determining each feature vector parameter of the plurality of feature vector parameters for each geographic area of the plurality of geographic areas may include identifying a plurality of feature vector parameters associated with the verified geographic area for each user of the plurality of users. The determining may also include excluding a plurality of feature vector parameters associated with each geographic area of the plurality of geographic areas that does not correspond to the verified geographic area.

In some non-limiting embodiments or aspects, the method may include receiving first transaction data associated with a plurality of first transactions involving a first user of the plurality of users. The method may also include determining a plurality of feature vector parameters for each geographic area of the plurality of geographic areas based on the first transaction data associated with the plurality of first transactions. The method may further include, based on the geographic area prediction model and the plurality of feature vector parameters for the verified geographic area of the first user, assigning a predicted geographic area to the first user. The method may further include assigning the predicted geographic area of the first user to a debit account associated with the first user.

In some non-limiting embodiments or aspects, the method may include determining, based on the first transaction data associated with a plurality of first transactions involving the first user, second transaction data associated with a second plurality of transactions involving the first user and a first plurality of merchants of the plurality of merchants in the predicted geographic area of the first user. The method may also include determining a geographic location of the first user in the predicted geographic area of the first user associated with a position of the first plurality of merchants based on the second transaction data associated with the second plurality of transactions.

In some non-limiting embodiments or aspects, the geographic location of the first user in the predicted geographic area of the first user may be associated with at least one geographic coordinate, wherein the at least one geographic coordinate includes a latitude coordinate, a longitude coordinate, or any combination thereof. The method may include determining a geographic location of each of the first plurality of merchants, wherein the geographic location of the user in the predicted geographic area of the user corresponds to a central position associated with the position of the first plurality of merchants. The transaction data associated with the plurality of transactions may include credit card transaction data associated with a plurality of credit card payment transactions and the verified geographic area may include a credit card billing geographic area. The geographic area may include a zip code and the verified geographic area may include a billing zip code associated with an account of a user.

In some non-limiting embodiments or aspects, the plurality of feature vector parameters may include at least one of the following: a maximum number of transactions involving a user in a maximum merchant category of a plurality of merchant categories; a transaction amount associated with the maximum number of transactions involving a user in the maximum merchant category of the plurality of merchant categories; a time of day associated with the maximum number of transactions in the maximum merchant category of the plurality of merchant categories; a day of a week associated with the maximum number of transactions in the maximum merchant category of the plurality of merchant categories; a transaction amount associated with a plurality of transactions in the maximum merchant category in the plurality of geographic areas; a transaction amount associated with a plurality of transactions in at least one of the following merchant categories: a merchant category associated with fuel, a merchant category associated with dry cleaning, a merchant category associated with laundry, a merchant category associated with mail, a merchant category associated with video rental, a merchant category associated with grocery, a merchant category associated with miscellaneous food sales, a merchant category associated with restaurant, a merchant category associated with quick service restaurant (QSR), or any combination thereof; a transaction amount associated with a plurality of transactions during a weekday of a week in a merchant category associated with restaurant, a merchant category associated with QSR, or any combination thereof; a transaction amount associated with a plurality of transactions during a weekend day of a week in a merchant category associated with restaurant, a merchant category associated with QSR, or any combination thereof; a time of day associated with at least one transaction in a merchant category of the plurality of merchant categories; a day of a week associated with at least one transaction in a merchant category of the plurality of merchant categories; a transaction amount associated with a plurality of transactions in each of the plurality of merchant categories in a geographic area; a transaction amount associated with a plurality of transactions in the plurality of merchant categories in a geographic area; or any combination thereof.

According to some non-limiting embodiments or aspects, provided is a system for predicting a specified geographic area of a user. The system includes at least one server computer including at least one processor. The at least one server computer is programmed and/or configured to receive transaction data associated with a plurality of transactions involving a plurality of users and a plurality of merchants during a predetermined time interval. The at least one server computer is also programmed and/or configured to generate a geographic area prediction model based on the transaction data by (i) determining a verified geographic area of a plurality of geographic areas for each user of the plurality of users, (ii) determining transaction data associated with a plurality of transactions involving each user of the plurality of users for each feature vector parameter of a plurality of feature vector parameters. Determining the transaction data includes determining each feature vector parameter of the plurality of feature vector parameters for each geographic area of the plurality of geographic areas, (iii) training the geographic area prediction model based on the plurality of feature vector parameters for the verified geographic area for each user of the plurality of users, and (iv) validating the geographic area prediction model based on the plurality of feature vector parameters for the verified geographic area for each user of the plurality of users.

In some non-limiting embodiments or aspects, determining each feature vector parameter of the plurality of feature vector parameters for each geographic area of the plurality of geographic areas may include identifying a plurality of feature vector parameters associated with the verified geographic area for each user of the plurality of users. It may also include excluding a plurality of feature vector parameters associated with each geographic area of the plurality of geographic areas that does not correspond to the verified geographic area. The at least one server computer may be programmed and/or configured to receive first transaction data associated with a plurality of first transactions involving a first user of the plurality of users. The at least one server computer may also be programmed and/or configured to determine a plurality of feature vector parameters for each geographic area of the plurality of geographic areas based on the first transaction data associated with the plurality of first transactions. The at least one server computer may further be programmed and/or configured to, based on the geographic area prediction model and the plurality of feature vector parameters for the verified geographic area of the first user, assign a predicted geographic area to the first user.

In some non-limiting embodiments or aspects, the at least one server computer may be programmed and/or configured to assign the predicted geographic area of the first user to a debit account associated with the first user. The at least one server computer may also be programmed and/or configured to determine, based on the first transaction data associated with a plurality of first transactions involving the first user, second transaction data associated with a second plurality of transactions involving the first user and a first plurality of merchants of the plurality of merchants in the predicted geographic area of the first user. The at least one server computer may further be programmed and/or configured to determine a geographic location of the first user in the predicted geographic area of the first user associated with a position of the first plurality of merchants based on the second transaction data associated with the second plurality of transactions. The geographic location of the first user in the predicted geographic area of the first user may be associated with at least one geographic coordinate, wherein the at least one geographic coordinate includes a latitude coordinate, a longitude coordinate, or any combination thereof. The at least one server computer may be further programmed and/or configured to determine a geographic location of each of the first plurality of merchants, wherein the geographic location of the user in the predicted geographic area of the user corresponds to a central position associated with the position of the first plurality of merchants. The transaction data associated with the plurality of transactions includes credit card transaction data may be associated with a plurality of credit card payment transactions and the verified geographic area may include a credit card billing geographic area. The geographic area may include a zip code and the verified geographic area may include a billing zip code associated with an account of a user.

In some non-limiting embodiments or aspects, the plurality of feature vector parameters may include at least one of the following: a maximum number of transactions involving a user in a maximum merchant category of a plurality of merchant categories; a transaction amount associated with the maximum number of transactions involving a user in the maximum merchant category of the plurality of merchant categories; a time of day associated with the maximum number of transactions in the maximum merchant category of the plurality of merchant categories; a day of a week associated with the maximum number of transactions in the maximum merchant category of the plurality of merchant categories; a transaction amount associated with a plurality of transactions in the maximum merchant category in the plurality of geographic areas; a transaction amount associated with a plurality of transactions in at least one of the following merchant categories: a merchant category associated with fuel, a merchant category associated with dry cleaning, a merchant category associated with laundry, a merchant category associated with mail, a merchant category associated with video rental, a merchant category associated with grocery, a merchant category associated with miscellaneous food sales, a merchant category associated with restaurant, a merchant category associated with quick service restaurant (QSR), or any combination thereof; a transaction amount associated with a plurality of transactions during a weekday of a week in a merchant category associated with restaurant, a merchant category associated with QSR, or any combination thereof; a transaction amount associated with a plurality of transactions during a weekend day of a week in a merchant category associated with restaurant, a merchant category associated with QSR, or any combination thereof; a time of day associated with at least one transaction in a merchant category of the plurality of merchant categories; a day of a week associated with at least one transaction in a merchant category of the plurality of merchant categories; a transaction amount associated with a plurality of transactions in each of the plurality of merchant categories in a geographic area; a transaction amount associated with a plurality of transactions in the plurality of merchant categories in a geographic area; or any combination thereof.

According to some non-limiting embodiments or aspects, provided is a computer program product for predicting a specified geographic area of a user. The computer program product includes at least one non-transitory computer-readable medium including program instructions that, when executed by at least one processor, cause the at least one processor to receive transaction data associated with a plurality of transactions involving a plurality of users and a plurality of merchants during a predetermined time interval. The program instructions also cause the at least one processor to generate a geographic area prediction model based on the transaction data, by (i) determining a verified geographic area of a plurality of geographic areas for each user of the plurality of users, (ii) determining transaction data associated with a plurality of transactions involving each user of the plurality of users for each feature vector parameter of a plurality of feature vector parameters, where determining the transaction data includes determining each feature vector parameter of the plurality of feature vector parameters for each geographic area of the plurality of geographic areas, (iii) training the geographic area prediction model based on the plurality of feature vector parameters for the verified geographic area for each user of the plurality of users, and (iv) validating the geographic area prediction model based on the plurality of feature vector parameters for the verified geographic area for each user of the plurality of users.

In some non-limiting embodiments or aspects, determining each feature vector parameter of the plurality of feature vector parameters for each geographic area of the plurality of geographic areas may include identifying a plurality of feature vector parameters associated with the verified geographic area for each user of the plurality of users. It also may include excluding a plurality of feature vector parameters associated with each geographic area of the plurality of geographic areas that does not correspond to the verified geographic area. The program instructions may cause the at least one processor to receive first transaction data associated with a plurality of first transactions involving a first user of the plurality of users. The program instructions may also cause the at least one processor to determine a plurality of feature vector parameters for each geographic area of the plurality of geographic areas based on the first transaction data associated with the plurality of first transactions. The program instructions may cause the at least one processor to, based on the geographic area prediction model and the plurality of feature vector parameters for the verified geographic area of the first user, assign a predicted geographic area to the first user. The program instructions may further cause the at least one processor to assign the predicted geographic area of the first user to a debit account associated with the first user. The program instructions may further cause the at least one processor to determine, based on the first transaction data associated with a plurality of first transactions involving the first user, second transaction data associated with a second plurality of transactions involving the first user and a first plurality of merchants of the plurality of merchants in the predicted geographic area of the first user. The program instructions may cause the at least one processor to determine a geographic location of the first user in the predicted geographic area of the first user associated with a position of the first plurality of merchants based on the second transaction data associated with the second plurality of transactions.

In some non-limiting embodiments or aspects, the geographic location of the first user in the predicted geographic area of the first user may be associated with at least one geographic coordinate. The at least one geographic coordinate may include a latitude coordinate, a longitude coordinate, or any combination thereof. The program instructions may cause the at least one processor to determine a geographic location of each of the first plurality of merchants. The geographic location of the user in the predicted geographic area of the user may correspond to a central position associated with the position of the first plurality of merchants. The transaction data associated with the plurality of transactions may include credit card transaction data associated with a plurality of credit card payment transactions and the verified geographic area includes a credit card billing geographic area. The geographic area may include a zip code and the verified geographic area may include a billing zip code associated with an account of a user.

In some non-limiting embodiments or aspects, the plurality of feature vector parameters may include at least one of the following: a maximum number of transactions involving a user in a maximum merchant category of a plurality of merchant categories; a transaction amount associated with the maximum number of transactions involving a user in the maximum merchant category of the plurality of merchant categories; a time of day associated with the maximum number of transactions in the maximum merchant category of the plurality of merchant categories; a day of a week associated with the maximum number of transactions in the maximum merchant category of the plurality of merchant categories; a transaction amount associated with a plurality of transactions in the maximum merchant category in the plurality of geographic areas; a transaction amount associated with a plurality of transactions in at least one of the following merchant categories: a merchant category associated with fuel, a merchant category associated with dry cleaning, a merchant category associated with laundry, a merchant category associated with mail, a merchant category associated with video rental, a merchant category associated with grocery, a merchant category associated with miscellaneous food sales, a merchant category associated with restaurant, a merchant category associated with quick service restaurant (QSR), or any combination thereof; a transaction amount associated with a plurality of transactions during a weekday of a week in a merchant category associated with restaurant, a merchant category associated with QSR, or any combination thereof; a transaction amount associated with a plurality of transactions during a weekend day of a week in a merchant category associated with restaurant, a merchant category associated with QSR, or any combination thereof; a time of day associated with at least one transaction in a merchant category of the plurality of merchant categories; a day of a week associated with at least one transaction in a merchant category of the plurality of merchant categories; a transaction amount associated with a plurality of transactions in each of the plurality of merchant categories in a geographic area; a transaction amount associated with a plurality of transactions in the plurality of merchant categories in a geographic area; or any combination thereof.

Further non-limiting embodiments or aspects are set forth in the following numbered clauses:

Clause 1: A method for predicting a specified geographic area of a user, comprising: receiving, with at least one processor, transaction data associated with a plurality of transactions involving a plurality of users and a plurality of merchants during a predetermined time interval; generating, with at least one processor, a geographic area prediction model based on the transaction data by: (i) determining a verified geographic area of a plurality of geographic areas for each user of the plurality of users; (ii) determining transaction data associated with a plurality of transactions involving each user of the plurality of users for each feature vector parameter of a plurality of feature vector parameters, wherein determining the transaction data comprises determining each feature vector parameter of the plurality of feature vector parameters for each geographic area of the plurality of geographic areas; (iii) training the geographic area prediction model based on the plurality of feature vector parameters for the verified geographic area for each user of the plurality of users; and (iv) validating the geographic area prediction model based on the plurality of feature vector parameters for the verified geographic area for each user of the plurality of users.

Clause 2: The method of clause 1, wherein determining each feature vector parameter of the plurality of feature vector parameters for each geographic area of the plurality of geographic areas comprises: identifying a plurality of feature vector parameters associated with the verified geographic area for each user of the plurality of users; and excluding a plurality of feature vector parameters associated with each geographic area of the plurality of geographic areas that does not correspond to the verified geographic area.

Clause 3: The method of clause 1 or clause 2, further comprising: receiving first transaction data associated with a plurality of first transactions involving a first user of the plurality of users; determining a plurality of feature vector parameters for each geographic area of the plurality of geographic areas based on the first transaction data associated with the plurality of first transactions; and based on the geographic area prediction model and the plurality of feature vector parameters for the verified geographic area of the first user, assigning a predicted geographic area to the first user.

Clause 4: The method of any of clauses 1-3, further comprising assigning the predicted geographic area of the first user to a debit account associated with the first user.

Clause 5: The method of any of clauses 1-4, further comprising: determining, based on the first transaction data associated with a plurality of first transactions involving the first user, second transaction data associated with a second plurality of transactions involving the first user and a first plurality of merchants of the plurality of merchants in the predicted geographic area of the first user; and determining a geographic location of the first user in the predicted geographic area of the first user associated with a position of the first plurality of merchants based on the second transaction data associated with the second plurality of transactions.

Clause 6: The method of any of clauses 1-5, wherein the geographic location of the first user in the predicted geographic area of the first user is associated with at least one geographic coordinate, wherein the at least one geographic coordinate comprises a latitude coordinate, a longitude coordinate, or any combination thereof.

Clause 7: The method of any of clauses 1-6, further comprising determining a geographic location of each of the first plurality of merchants, wherein the geographic location of the user in the predicted geographic area of the user corresponds to a central position associated with the position of the first plurality of merchants.

Clause 8: The method of any of clauses 1-7, wherein the transaction data associated with the plurality of transactions comprises credit card transaction data associated with a plurality of credit card payment transactions and the verified geographic area comprises a credit card billing geographic area.

Clause 9: The method of any of clauses 1-8, wherein the geographic area comprises a zip code and wherein the verified geographic area comprises a billing zip code associated with an account of a user.

Clause 10: The method of any of clauses 1-9, wherein the plurality of feature vector parameters comprises at least one of the following: a maximum number of transactions involving a user in a maximum merchant category of a plurality of merchant categories; a transaction amount associated with the maximum number of transactions involving a user in the maximum merchant category of the plurality of merchant categories; a time of day associated with the maximum number of transactions in the maximum merchant category of the plurality of merchant categories; a day of a week associated with the maximum number of transactions in the maximum merchant category of the plurality of merchant categories; a transaction amount associated with a plurality of transactions in the maximum merchant category in the plurality of geographic areas; a transaction amount associated with a plurality of transactions in at least one of the following merchant categories: a merchant category associated with fuel, a merchant category associated with dry cleaning, a merchant category associated with laundry, a merchant category associated with mail, a merchant category associated with video rental, a merchant category associated with grocery, a merchant category associated with miscellaneous food sales, a merchant category associated with restaurant, a merchant category associated with QSR, or any combination thereof; a transaction amount associated with a plurality of transactions during a weekday of a week in a merchant category associated with restaurant, a merchant category associated with QSR, or any combination thereof; a transaction amount associated with a plurality of transactions during a weekend day of a week in a merchant category associated with restaurant, a merchant category associated with QSR, or any combination thereof; a time of day associated with at least one transaction in a merchant category of the plurality of merchant categories; a day of a week associated with at least one transaction in a merchant category of the plurality of merchant categories; a transaction amount associated with a plurality of transactions in each of the plurality of merchant categories in a geographic area; a transaction amount associated with a plurality of transactions in the plurality of merchant categories in a geographic area; or any combination thereof.

Clause 11: A system for predicting a specified geographic area of a user, the system comprising at least one server computer including at least one processor, the at least one server computer programmed and/or configured to: receive transaction data associated with a plurality of transactions involving a plurality of users and a plurality of merchants during a predetermined time interval; generate a geographic area prediction model based on the transaction data by: (i) determining a verified geographic area of a plurality of geographic areas for each user of the plurality of users; (ii) determining transaction data associated with a plurality of transactions involving each user of the plurality of users for each feature vector parameter of a plurality of feature vector parameters, wherein determining the transaction data comprises determining each feature vector parameter of the plurality of feature vector parameters for each geographic area of the plurality of geographic areas; (iii) training the geographic area prediction model based on the plurality of feature vector parameters for the verified geographic area for each user of the plurality of users; and (iv) validating the geographic area prediction model based on the plurality of feature vector parameters for the verified geographic area for each user of the plurality of users.

Clause 12: The system of clause 11, wherein determining each feature vector parameter of the plurality of feature vector parameters for each geographic area of the plurality of geographic areas comprises: identifying a plurality of feature vector parameters associated with the verified geographic area for each user of the plurality of users; and excluding a plurality of feature vector parameters associated with each geographic area of the plurality of geographic areas that does not correspond to the verified geographic area.

Clause 13: The system of clause 11 or clause 12, wherein the at least one server computer is further programmed and/or configured to: receive first transaction data associated with a plurality of first transactions involving a first user of the plurality of users; determine a plurality of feature vector parameters for each geographic area of the plurality of geographic areas based on the first transaction data associated with the plurality of first transactions; and based on the geographic area prediction model and the plurality of feature vector parameters for the verified geographic area of the first user, assign a predicted geographic area to the first user.

Clause 14: The system of any of clauses 11-13, wherein the at least one server computer is further programmed and/or configured to assign the predicted geographic area of the first user to a debit account associated with the first user.

Clause 15: The system of any of clauses 11-14, wherein the at least one server computer is further programmed and/or configured to: determine, based on the first transaction data associated with a plurality of first transactions involving the first user, second transaction data associated with a second plurality of transactions involving the first user and a first plurality of merchants of the plurality of merchants in the predicted geographic area of the first user; and determine a geographic location of the first user in the predicted geographic area of the first user associated with a position of the first plurality of merchants based on the second transaction data associated with the second plurality of transactions.

Clause 16: The system of any of clauses 11-15, wherein the geographic location of the first user in the predicted geographic area of the first user is associated with at least one geographic coordinate, wherein the at least one geographic coordinate comprises a latitude coordinate, a longitude coordinate, or any combination thereof.

Clause 17: The system of any of clauses 11-16, wherein the at least one server computer is further programmed and/or configured to determine a geographic location of each of the first plurality of merchants, wherein the geographic location of the user in the predicted geographic area of the user corresponds to a central position associated with the position of the first plurality of merchants.

Clause 18: The system of any of clauses 11-17, wherein the transaction data associated with the plurality of transactions comprises credit card transaction data associated with a plurality of credit card payment transactions and the verified geographic area comprises a credit card billing geographic area.

Clause 19: The system of any of clauses 11-18, wherein the geographic area comprises a zip code and wherein the verified geographic area comprises a billing zip code associated with an account of a user.

Clause 20: The system of any of clauses 11-19, wherein the plurality of feature vector parameters comprises at least one of the following: a maximum number of transactions involving a user in a maximum merchant category of a plurality of merchant categories; a transaction amount associated with the maximum number of transactions involving a user in the maximum merchant category of the plurality of merchant categories; a time of day associated with the maximum number of transactions in the maximum merchant category of the plurality of merchant categories; a day of a week associated with the maximum number of transactions in the maximum merchant category of the plurality of merchant categories; a transaction amount associated with a plurality of transactions in the maximum merchant category in the plurality of geographic areas; a transaction amount associated with a plurality of transactions in at least one of the following merchant categories: a merchant category associated with fuel, a merchant category associated with dry cleaning, a merchant category associated with laundry, a merchant category associated with mail, a merchant category associated with video rental, a merchant category associated with grocery, a merchant category associated with miscellaneous food sales, a merchant category associated with restaurant, a merchant category associated with QSR, or any combination thereof; a transaction amount associated with a plurality of transactions during a weekday of a week in a merchant category associated with restaurant, a merchant category associated with QSR, or any combination thereof; a transaction amount associated with a plurality of transactions during a weekend day of a week in a merchant category associated with restaurant, a merchant category associated with QSR, or any combination thereof; a time of day associated with at least one transaction in a merchant category of the plurality of merchant categories; a day of a week associated with at least one transaction in a merchant category of the plurality of merchant categories; a transaction amount associated with a plurality of transactions in each of the plurality of merchant categories in a geographic area; a transaction amount associated with a plurality of transactions in the plurality of merchant categories in a geographic area; or any combination thereof.

Clause 21: A computer program product for predicting a specified geographic area of a user, the computer program product comprising at least one non-transitory computer-readable medium including program instructions that, when executed by at least one processor, cause the at least one processor to: receive transaction data associated with a plurality of transactions involving a plurality of users and a plurality of merchants during a predetermined time interval; generate a geographic area prediction model based on the transaction data by: (i) determining a verified geographic area of a plurality of geographic areas for each user of the plurality of users; (ii) determining transaction data associated with a plurality of transactions involving each user of the plurality of users for each feature vector parameter of a plurality of feature vector parameters, wherein determining the transaction data comprises determining each feature vector parameter of the plurality of feature vector parameters for each geographic area of the plurality of geographic areas; (iii) training the geographic area prediction model based on the plurality of feature vector parameters for the verified geographic area for each user of the plurality of users; and (iv) validating the geographic area prediction model based on the plurality of feature vector parameters for the verified geographic area for each user of the plurality of users.

Clause 22: The computer program product of clause 21, wherein determining each feature vector parameter of the plurality of feature vector parameters for each geographic area of the plurality of geographic areas comprises: identifying a plurality of feature vector parameters associated with the verified geographic area for each user of the plurality of users; and excluding a plurality of feature vector parameters associated with each geographic area of the plurality of geographic areas that does not correspond to the verified geographic area.

Clause 23: The computer program product of clause 21 or clause 22, wherein the program instructions further cause the at least one processor to: receive first transaction data associated with a plurality of first transactions involving a first user of the plurality of users; determine a plurality of feature vector parameters for each geographic area of the plurality of geographic areas based on the first transaction data associated with the plurality of first transactions; and based on the geographic area prediction model and the plurality of feature vector parameters for the verified geographic area of the first user, assign a predicted geographic area to the first user.

Clause 24: The computer program product of any of clauses 21-23, wherein the program instructions further cause the at least one processor to assign the predicted geographic area of the first user to a debit account associated with the first user.

Clause 25: The computer program product of any of clauses 21-24, wherein the program instructions further cause the at least one processor to: determine, based on the first transaction data associated with a plurality of first transactions involving the first user, second transaction data associated with a second plurality of transactions involving the first user and a first plurality of merchants of the plurality of merchants in the predicted geographic area of the first user; and determine a geographic location of the first user in the predicted geographic area of the first user associated with a position of the first plurality of merchants based on the second transaction data associated with the second plurality of transactions.

Clause 26: The computer program product of any of clauses 21-25, wherein the geographic location of the first user in the predicted geographic area of the first user is associated with at least one geographic coordinate, wherein the at least one geographic coordinate comprises a latitude coordinate, a longitude coordinate, or any combination thereof.

Clause 27: The computer program product of any of clauses 21-26, wherein the program instructions further cause the at least one processor to determine a geographic location of each of the first plurality of merchants, wherein the geographic location of the user in the predicted geographic area of the user corresponds to a central position associated with the position of the first plurality of merchants.

Clause 28: The computer program product of any of clauses 21-27, wherein the transaction data associated with the plurality of transactions comprises credit card transaction data associated with a plurality of credit card payment transactions and the verified geographic area comprises a credit card billing geographic area.

Clause 29: The computer program product of any of clauses 21-28, wherein the geographic area comprises a zip code and wherein the verified geographic area comprises a billing zip code associated with an account of a user.

Clause 30: The computer program product of any of clauses 21-29, wherein the plurality of feature vector parameters comprises at least one of the following: a maximum number of transactions involving a user in a maximum merchant category of a plurality of merchant categories; a transaction amount associated with the maximum number of transactions involving a user in the maximum merchant category of the plurality of merchant categories; a time of day associated with the maximum number of transactions in the maximum merchant category of the plurality of merchant categories; a day of a week associated with the maximum number of transactions in the maximum merchant category of the plurality of merchant categories; a transaction amount associated with a plurality of transactions in the maximum merchant category in the plurality of geographic areas; a transaction amount associated with a plurality of transactions in at least one of the following merchant categories: a merchant category associated with fuel, a merchant category associated with dry cleaning, a merchant category associated with laundry, a merchant category associated with mail, a merchant category associated with video rental, a merchant category associated with grocery, a merchant category associated with miscellaneous food sales, a merchant category associated with restaurant, a merchant category associated with QSR, or any combination thereof; a transaction amount associated with a plurality of transactions during a weekday of a week in a merchant category associated with restaurant, a merchant category associated with QSR, or any combination thereof; a transaction amount associated with a plurality of transactions during a weekend day of a week in a merchant category associated with restaurant, a merchant category associated with QSR, or any combination thereof; a time of day associated with at least one transaction in a merchant category of the plurality of merchant categories; a day of a week associated with at least one transaction in a merchant category of the plurality of merchant categories; a transaction amount associated with a plurality of transactions in each of the plurality of merchant categories in a geographic area; a transaction amount associated with a plurality of transactions in the plurality of merchant categories in a geographic area; or any combination thereof.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
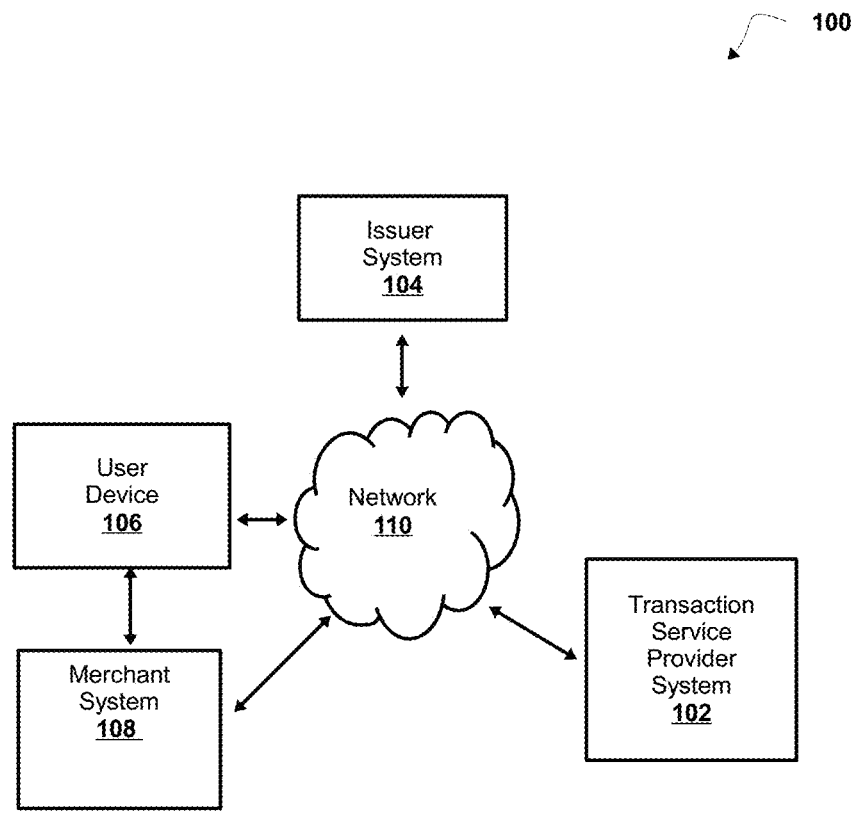
FIG. 1 is a schematic diagram of a system for predicting a specified geographic area of a user, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects of the disclosed subject matter. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

The term "client device," as used herein, may refer to one or more computing devices that are configured to communicate with one or more servers via a network. In some non-limiting embodiments or aspects, a client device may include a device and/or a system configured to communicate with another device and/or another system that is remote from the client device (e.g., that is connected to a network that is different from the network to which the client device is connected).

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system" or "point-of-sale (POS) device" as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Referring now to FIG. 1, shown is a schematic diagram of an example system 100 for predicting a specified geographic area of a user, according to some non-limiting embodiments or aspects. In particular, FIG. 1 illustrates a system 100 in which devices, systems, and/or methods, described herein, may be implemented. As shown in FIG. 1, system 100 may include transaction service provider system 102, issuer system 104, user device 106, merchant system 108, and network 110. Transaction service provider system 102, issuer system 104, user device 106, and/or merchant system 108 may interconnect (e.g., establish a connection to communicate) via wired connections, wireless connections, or a combination of wired and wireless connections.

Transaction service provider system 102 may include one or more devices capable of receiving information from and/or communicating information to issuer system 104, user device 106, and/or merchant system 108 via network 110. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to the transaction service provider system 102. In some non-limiting embodiments or aspects, transaction service provider system 102 may be capable of receiving information from, storing information in, communicating information to, or searching information stored in data storage device.

Issuer system 104 may include one or more devices capable of receiving information and/or communicating information to transaction service provider system 102, user device 106, and/or merchant system 108, via network 110. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with user device 106.

User device 106 may include one or more devices capable of receiving information from and/or communicating information to transaction service provider system 102, issuer system 104, and/or merchant system 108, via network 110. For example, user device 106 may include a client device and/or the like. In some non-limiting embodiments or aspects, user device 106 may or may not be capable of receiving information (e.g., from merchant system 108, from a remote system, and/or like) via a short-range wireless communication connection (e.g., an NFC communication connection, an RFID communication connection, a Bluetooth® communication connection, and/or the like), and/or communicating information (e.g., to merchant system 108, to a remote system, and/or the like) via a short-range wireless communication connection.

Merchant system 108 may include one or more devices capable of receiving information from and/or communicating information to transaction service provider system 102, issuer system 104, and/or user device 106, via network 110. Merchant system 108 may also include a device capable of receiving information from user device 106 via network 110, a communication connection (e.g., an NFC communication connection, an RFID communication connection, a Bluetooth® communication connection, and/or the like) with user device 106, and/or the like, and/or communicating information to user device 106 via the network, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more user devices 106. For example, merchant system 108 may include user device 106 that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Network 110 may include one or more wired and/or wireless networks. For example, network 110 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems and devices shown in FIG. 1 are provided as an example. There may be additional systems and/or devices, fewer systems and/or devices, different systems and/or devices, or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of system 100 may perform one or more functions described as being performed by another set of systems or another set of devices of system 100.

Figure 2:
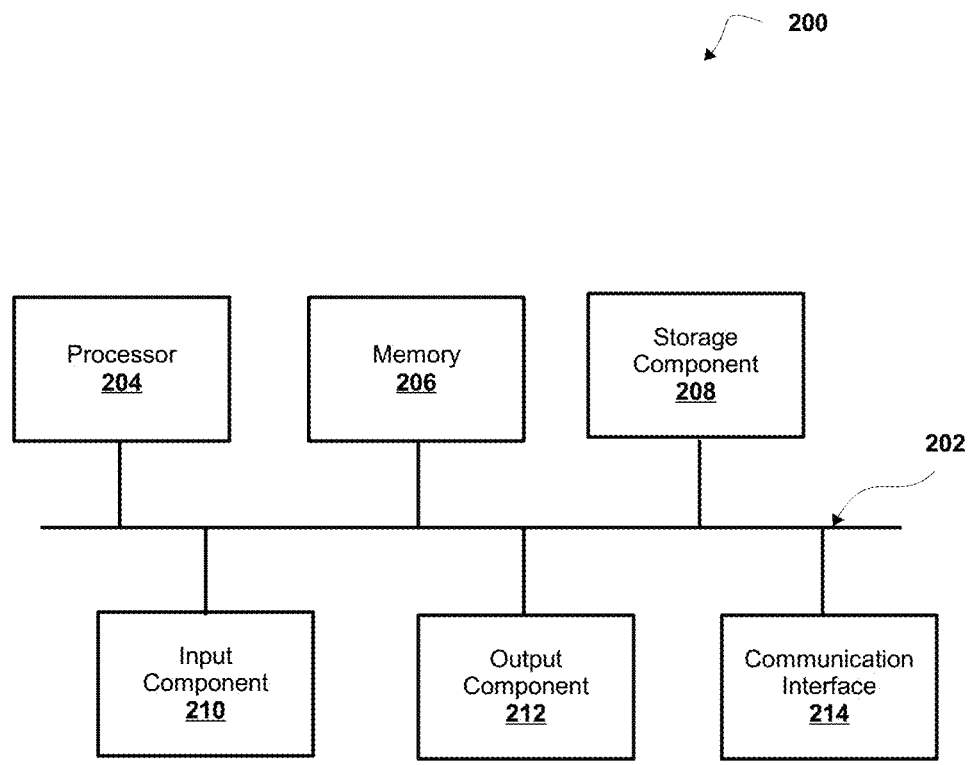
FIG. 2 is a schematic diagram of example components of one or more devices of FIG. 1, according to some non-limiting embodiments or aspects.

Referring now to FIG. 2, shown is a diagram of example components of a device 200. Device 200 may correspond to transaction service provider system 102, issuer system 104, user device 106, or merchant system 108, as an example. In some non-limiting embodiments, such systems or devices may include at least one device 200 and/or at least one component of device 200. The number and arrangement of components shown are provided as an example. In some non-limiting embodiments, device 200 may include additional components, fewer components, different components, or differently arranged components than those shown. Additionally, or alternatively, a set of components (e.g., one or more components) of device 200 may perform one or more functions described as being performed by another set of components of device 200.

As shown in FIG. 2, device 200 may include bus 202, processor 204, memory 206, storage component 208, input component 210, output component 212, and communication interface 214. Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid-state disk, etc.) and/or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Non-limiting embodiments of the present disclosure are directed to systems, methods, and computer program products for predicting a specified geographic area of a user, e.g., a financial device holder. Non-limiting embodiments provide a process for determining an account holder's location automatically from transaction data, which supplies missing information to existing computerized financial transaction analytic systems. This improves the accuracy and efficiency of those systems and further allows communications to consumers to be geographic region-specific, which improves the relevance of the communicated data. Moreover, existing incentive and award programs that target prospective consumers are improved if the location of customers can be predicted. To that end, a consumer may engage in a trans-action, which may trigger an automated incentive or award to be communicated to their communication device, and the incentive or award may be tailored for merchants within the consumer's home geographic area. This increases the likelihood of additional transactions within the geographic area and leverages the predicted geographic area as a means of improving existing promotional systems. In this manner, a cyclical, recurring feedback loop can be created, including: collecting transaction data, predicting a specified geographic area, transmitting an incentive for transaction, and achieving the incentivized transaction, which therein provides more transaction data for further loops. This can create a constantly improving geographic area prediction model, which is an improvement over past systems where such user geographic area data may remain unknown.

Figure 3A:
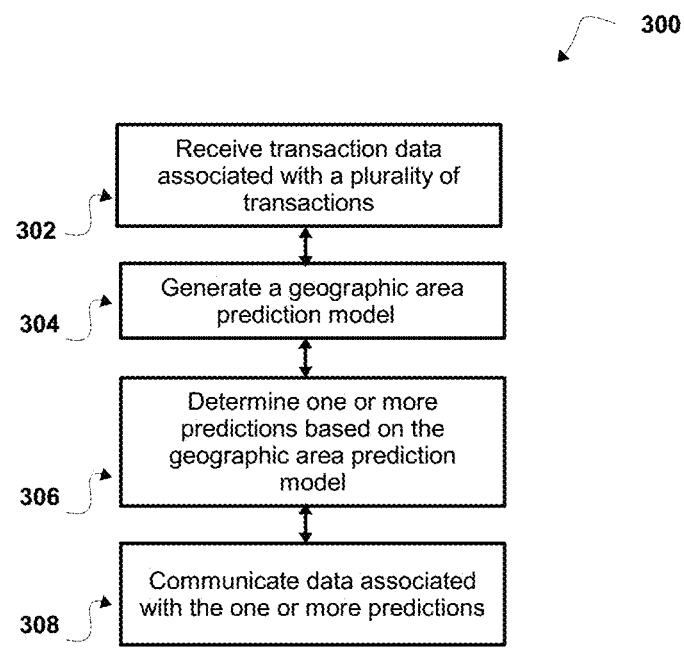
FIG. 3A is a flow diagram of a method for predicting a specified geographic area of a user, according to some non-limiting embodiments or aspects.

Referring now to FIG. 3A, shown is a flow diagram of a method for predicting a specified geographic area of a user, according to some non-limiting embodiments or aspects. The steps of process 300, shown in FIG. 3A, are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. In some non-limiting embodiments or aspects, one or more of the steps of process 300 may be performed (e.g., completely, partially, etc.) by transaction service provider system 102 (e.g., one or more devices of transaction service provider system 102). In some non-limiting embodiments or aspects, one or more of the steps of process 300 may be performed (e.g., completely, partially, etc.) by another device or a group of devices separate from or including transaction service provider system 102, such as issuer system 104 (e.g., one or more devices of issuer system 104), user device 106, or merchant system 108 (e.g., one or more devices of merchant system 108).

As shown in FIG. 3A, at step 302, process 300 may include, receiving transaction data associated with a plurality of payment transactions. For example, transaction service provider system 102 may receive transaction data (e.g., historical transaction data, first transaction data, first historical transaction data, and/or the like) associated with a plurality of payment transactions involving (e.g., conducted by) a user, a plurality of users, and/or the like. In some non-limiting embodiments or aspects, the transaction data may be associated with a plurality of payment transactions involving one or more accounts (e.g., a credit card account, a debit card account, and/or the like) associated with a user, a plurality of accounts of a plurality of users, and/or the like. In some non-limiting embodiments or aspects, the transaction data may be associated with a plurality of payment transactions involving one or more debit accounts of a plurality of users independent of a plurality of payment transactions involving one or more credit accounts of the plurality of users.

In some non-limiting embodiments or aspects, transaction service provider system 102 may receive the transaction data from issuer system 104 and/or merchant system 108 (e.g., via network 110). For example, transaction service provider system 102 may receive the transaction data from merchant system 108 via network 110 in real-time while a payment transaction is being conducted, after a payment transaction has been authorized, after a payment transaction has been cleared, and/or after a payment transaction has been settled. In some non-limiting embodiments or aspects, historical transaction data may include transaction data associated with one or more payment transactions that have been authorized, cleared, and/or settled.

In some non-limiting embodiments or aspects, the transaction data may be associated with a payment transaction (e.g., a payment transaction of a plurality of payment transactions) and/or a plurality of payment transactions. For example, the transaction data may be associated with a payment transaction involving a user (e.g., a user associated with user device 106) and a merchant (e.g., a merchant associated with merchant system 108). In some non-limiting embodiments or aspects, the plurality of payment transactions may involve a plurality of users and a plurality of merchants and each payment transaction of the plurality of payment transactions may involve a single user and a single merchant.

In some non-limiting embodiments or aspects, the transaction data associated with a payment transaction may include transaction amount data associated with an amount of the payment transaction (e.g., a cost associated with the payment transaction, a transaction amount, an overall transaction amount, a cost of one or more products involved in the payment transaction, and/or the like), transaction time data associated with a time interval at which the payment transaction occurred (e.g., a time of day, a day of the week, a day of a month, a month of a year, a predetermined time of day segment such as morning, afternoon, evening, night, and/or the like, a predetermined day of the week segment such as weekday, weekend, and/or the like, a predetermined segment of a year such as first quarter, second quarter, and/or the like), transaction type data associated with a transaction type of the payment transaction (e.g., an online transaction, a card present transaction, a face-to-face transaction, and/or the like), and/or the like.

Additionally or alternatively, the transaction data may include user transaction data associated with the user involved in the payment transaction and/or merchant transaction data associated with the merchant involved in the payment transaction. In some embodiments, user transaction data may include user identity data associated with an identity of the user (e.g., a unique identifier of the user, a name of the user, and/or the like), user account data associated with an account of the user (e.g., an account identifier associated with the user, a PAN associated with a credit and/or debit account of the user, a token associated with a credit and/or debit account of the user, and/or the like), user location data associated with a location of a user (e.g., user location data associated with a geographic area in which a user resides, user location data associated with a billing zip code of an account of a user, and/or the like), and/or the like.

In some embodiments, merchant transaction data may include merchant identity data associated with an identity of a merchant (e.g., merchant identity data associated with a unique identifier of a merchant, merchant identity data associated with a name of a merchant, and/or the like), merchant category data associated with at least one merchant category of a merchant (e.g., merchant category data associated with a code for at least one merchant category of a merchant, merchant category data associated with a name of a merchant category of a merchant, merchant category data associated with a type of a merchant category of a merchant, and/or the like), merchant account data associated with an account of a merchant (e.g., merchant account data associated with an account identifier of an account of a merchant, merchant account data associated with a PAN regarding an account of a merchant, merchant account data associated with a token regarding an account of a merchant, and/or the like), merchant location data associated with a location of a merchant (e.g., merchant location data associated with a geographic area in which a location of a merchant is located, merchant location data associated with a zip code in which a location of a merchant is located, and/or the like), and/or the like.

In some non-limiting embodiments or aspects, transaction data associated with a payment transaction (e.g., each payment transaction of a plurality of payment transactions) may identify a merchant category of a merchant involved in the payment transaction. For example, transaction data associated with the payment transaction may include merchant transaction data that identifies a merchant category of a merchant involved in the payment transaction. A merchant category may be information that is used to classify the merchant based on the type of goods or services the merchant provides. In some non-limiting embodiments or aspects, a payment transaction may involve a merchant that is associated with a merchant category of a plurality of merchant categories.

In some non-limiting embodiments or aspects, transaction data associated with a payment transaction may identify a time (e.g., a time of day, a day, a week, a month, a year, a predetermined time interval, and/or the like) at which the payment transaction occurred. For example, the transaction data associated with the payment transaction may include transaction time data that identifies a time interval at which the payment transaction occurred.

As shown in FIG. 3A, at step 304, process 300 may include generating a geographic area prediction model based on the transaction data. For example, transaction service provider system 102 may generate the geographic area prediction model based on the transaction data associated with the plurality of transactions. In some non-limiting embodiments or aspects, transaction service provider system 102 may analyze the transaction data to generate the geographic area prediction model. In some non-limiting embodiments or aspects, transaction service provider system 102 may generate the geographic area prediction model by generating a rule for the geographic area prediction model based on transaction data (e.g., historical transaction data) associated with a payment transaction and/or a plurality of payment transactions. In some non-limiting embodiments or aspects, historical transaction data may include transaction data associated with one or more payment transactions that have been authorized, cleared, and/or settled.

In some non-limiting embodiments or aspects, the geographic area prediction model may include a model designed to receive, as an input, transaction data associated with a plurality of payment transactions involving a user, and provide, as an output, a prediction of a geographic area (e.g., a state, a city, a county of a state, a municipality of a state, a zip code, a five digit zip code, a neighborhood, and/or the like) in which the user resides (e.g., a location in which the user lives). For example, the geographic area prediction model may be designed to receive historical transaction data associated with a user (e.g., historical transaction data associated with payment transactions involving an account of a user) and provide an output of a prediction of a geographic area in which the user resides. In some non-limiting embodiments or aspects, transaction service provider system 102 may store the geographic area prediction model (e.g., for later use).

In some non-limiting embodiments or aspects, transaction service provider system 102 may process the transaction data to obtain training data for the geographic area prediction model. For example, transaction service provider system 102 may process the transaction data to change the transaction data into a format that may be analyzed (e.g., by transaction service provider system 102) to generate a geographic area prediction model. The transaction data that is changed may be referred to as training data. In some non-limiting embodiments or aspects, transaction service provider system 102 may process the transaction data to obtain the training data based on receiving the transaction data. Additionally, or alternatively, transaction service provider system 102 may process the transaction data to obtain the training data based on transaction service provider system 102 receiving an indication that transaction service provider system 102 is to process the transaction data from a user of transaction service provider system 102, such as when transaction service provider system 102 receives an indication to create a geographic area prediction model for a period of time corresponding to the transaction data.

In some non-limiting embodiments or aspects, transaction service provider system 102 may process the transaction data by determining a transaction variable based on the transaction data. A transaction variable may include a metric, associated with a payment transaction, which may be derived based on the transaction data. The transaction variable may be analyzed to generate a geographic area prediction model. For example, the transaction variable may include a variable associated with a maximum number of transactions involving a user in a maximum merchant category of a plurality of merchant categories (e.g., a merchant category of a plurality of merchant categories in which a user conducted a maximum number of payment transactions); a variable associated with a transaction amount associated with the maximum number of transactions involving a user in the maximum merchant category of the plurality of merchant categories; a variable associated with a time of day associated with the maximum number of transactions in the maximum merchant category of the plurality of merchant categories; a variable associated with a day of a week associated with the maximum number of transactions in the maximum merchant category of the plurality of merchant categories; a variable associated with a transaction amount associated with a plurality of transactions in the maximum merchant category in the plurality of geographic areas; a variable associated with a transaction amount associated with a plurality of transactions in at least one of the following merchant categories: a merchant category associated with fuel, a merchant category associated with dry cleaning, a merchant category associated with laundry, a merchant category associated with mail, a merchant category associated with video rental, a merchant category associated with grocery, a merchant category associated with miscellaneous food sales, a merchant category associated with restaurant, and/or a merchant category associated with QSR; a variable associated with a transaction amount associated with a plurality of transactions during a weekday of a week in a merchant category associated with restaurant, a merchant category associated with QSR, or any combination thereof; a variable associated with a transaction amount associated with a plurality of transactions during a weekend day of a week in a merchant category associated with restaurant, and/or a merchant category associated with QSR; a variable associated with a time of day associated with at least one transaction in a merchant category of the plurality of merchant categories; a variable associated with a day of a week associated with at least one transaction in a merchant category of the plurality of merchant categories; a variable associated with a transaction amount associated with a plurality of transactions in each of the plurality of merchant categories in a geographic area; and/or a variable associated with a transaction amount associated with a plurality of transactions in the plurality of merchant categories in a geographic area.

In some non-limiting embodiments or aspects, transaction service provider system 102 may analyze the training data to generate the geographic area prediction model. For example, transaction service provider system 102 may use machine learning techniques to analyze the training data to generate the geographic area prediction model. In some non-limiting embodiments or aspects, generating the geographic area prediction model (e.g., based on training data obtained from historical transaction data) may be referred to as training the geographic area prediction model. The machine learning techniques may include, for example, supervised and/or unsupervised techniques, such as decision trees (e.g., gradient boosted decision trees), logistic regressions, artificial neural networks, Bayesian statistics, learning automata, Hidden Markov Modeling, linear classifiers, quadratic classifiers, association rule learning, or the like. In some non-limiting embodiments or aspects, the geographic area prediction model may include a model that is specific to a particular group of users, a particular group of merchants, a particular group of merchants in a predetermined geographical area, and/or the like. Additionally, or alternatively, the geographic area prediction model may be specific to a particular user. In some non-limiting embodiments or aspects, transaction service provider system 102 may generate one or more geographic area prediction models for one or more users, a particular group of users, and/or a particular geographic area of one or more users.

Additionally, or alternatively, when analyzing the training data, transaction service provider system 102 may identify one or more transaction variables (e.g., one or more independent variables) as predictor variables that may be used to make a prediction (e.g., when analyzing the training data). In some non-limiting embodiments or aspects, values of the predictor variables may be inputs to the geographic area prediction model. For example, transaction service provider system 102 may identify a subset (e.g., a proper subset) of the transaction variables as predictor variables that may be used to accurately predict a geographic area in which the user resides. In some non-limiting embodiments or aspects, the predictor variables may include one or more of the transaction variables, as discussed above, that have a significant impact (e.g., an impact satisfying a threshold) on a probability that a user resides in a geographic area as determined by transaction service provider system 102.

In some non-limiting embodiments or aspects, the geographic area prediction model, created by transaction service provider system 102, may be designed to receive, as an input, data associated with one or more users (e.g., transaction data associated with a plurality of payment transactions involving one or more users), and provide, as an output, a prediction of a geographic area in which the user resides. For example, the geographic area prediction model may receive the input and may provide the output that includes a prediction of a geographic area in which the user resides. In some non-limiting embodiments or aspects, the geographic area prediction model may be designed to receive, as an input, one or more transaction variables, identified as predictor variables and associated with a user, and provide, as an output, a prediction (e.g., a probability, a binary output, a yes-no output, a score, a prediction score, and/or the like) of a geographic area in which the user resides.

In some non-limiting embodiments or aspects, transaction service provider system 102 may validate the geographic area prediction model. For example, transaction service provider system 102 may validate the geographic area prediction model after transaction service provider system 102 generates the geographic area prediction model. In some non-limiting embodiments or aspects, transaction service provider system 102 may validate the geographic area prediction model based on a portion of the training data to be used for validation. For example, transaction service provider system 102 may partition the training data into a first portion and a second portion, where the first portion may be used to generate the geographic area prediction model, as described above. In this example, the second portion of the training data (e.g., the validation data) may be used to validate the geographic area prediction model.

In some non-limiting embodiments or aspects, transaction service provider system 102 may validate the geographic area prediction model by providing validation data associated with a user (e.g., transaction data associated with one or more payment transactions involving a user) as input to the geographic area prediction model and determining, based on an output of the geographic area prediction model, whether the geographic area prediction model correctly, or incorrectly, predicted that the user resides in a geographic area determined using the geographic area prediction model. In some non-limiting embodiments or aspects, transaction service provider system 102 may validate the geographic area prediction model based on a validation threshold. For example, transaction service provider system 102 may be configured to validate the geographic area prediction model when the geographic area prediction model correctly predicts that a user resides in a geographic area (e.g., when the geographic area prediction model correctly predicts that a user resides in a geographic area in 50% of a plurality of predictions, when the geographic area prediction model correctly predicts that a user resides in a geographic area in 70% of a plurality of predictions, when the geographic area prediction model correctly predicts that a user resides in a geographic area in a threshold quantity of a plurality of predictions, and/or the like).

In some non-limiting embodiments or aspects, if transaction service provider system 102 does not validate the geographic area prediction model (e.g., when a percentage of predictions that a user resides in a geographic area does not satisfy the validation threshold), then transaction service provider system 102 may generate additional geographic area prediction models.

In some non-limiting embodiments or aspects, once the geographic area prediction model has been validated, transaction service provider system 102 may further train the geographic area prediction model and/or create new geographic area prediction models based on receiving new training data. The new training data may include additional transaction data associated with one or more payment transactions. In some non-limiting embodiments or aspects, the new training data may include transaction data relating to a prediction that a user resides in a geographic area. For example, transaction service provider system 102 may use the geographic area prediction model to predict that a user will conduct a payment transaction in a geographic area. In such an example, transaction service provider system 102 may have communicated an offer to the user based on the prediction, and despite communicating the offer to the user, the user did not conduct a payment transaction in the geographic area (e.g., within a predetermined amount of time of transaction service provider system 102 communicating the offer to the user). In such an example, transaction service provider system 102 may update one or more geographic area prediction models based on this new training data.

In some non-limiting embodiments or aspects, transaction service provider system 102 may store the geographic area prediction model. For example, transaction service provider system 102 may store the geographic area prediction model in a data structure (e.g., a database, a linked list, a tree, and/or the like). The data structure may be located within transaction service provider system 102 or external, and possibly remote from, transaction service provider system 102.

Further details regarding step 304 are provided with reference to FIG. 3B, which is explained in more detail below.

As shown in FIG. 3A, at step 306, process 300 may include determining one or more predictions based on the geographic area prediction model. For example, transaction service provider system 102 may determine one or more predictions of a geographic area in which a user resides based on the geographic area prediction model. In some non-limiting embodiments or aspects, transaction service provider system 102 may determine a plurality of predictions based on the geographic area prediction model and transaction data associated with one or more payment transactions (e.g., historical transaction data, transaction data associated with a plurality of transactions that is different from transaction data associated with a plurality of transactions used to generate a geographic area prediction model, and/or the like). In some non-limiting embodiments or aspects, the transaction data used to determine the plurality of predictions may be the same or similar to the transaction data to generate the geographic area prediction model. In some non-limiting embodiments or aspects, the transaction data used to determine the plurality of predictions may be associated with a plurality of payment transactions in a plurality of merchant categories conducted during a time interval.

In some non-limiting embodiments or aspects, transaction service provider system 102 may determine latitude and longitude information based on the one or more predictions determined by transaction service provider system 102 using the geographic area prediction model. For example, transaction service provider system 102 may determine a plurality of transactions conducted by the user within a geographic area corresponding to the geographic area associated with a prediction determined by transaction service provider system 102 using the geographic area prediction model. Transaction service provider system 102 may determine latitude and longitude information associated with a location of each merchant of a plurality of merchants involved in the plurality of transactions. Transaction service provider system 102 may determine latitude and longitude information associated with a central location of an area (e.g., a location that is equidistant from all locations in an area, a centroid of an area, and/or the like) that includes the latitude and longitude information associated with a location of each merchant of a plurality of merchants. In some non-limiting embodiments or aspects, transaction service provider system 102 may assign the central location of the area that includes the latitude and longitude information associated with the location of each merchant of the plurality of merchants as a location of the user (e.g., a location of the user associated with user device 106) which conducted the plurality of transactions.

As shown in FIG. 3A, at step 308, process 300 includes communicating data associated with one or more predictions. For example, transaction service provider system 102 may communicate data associated with one or more predictions to issuer system 104, user device 106, and/or merchant system 108 based on determining the one or more predictions. In some non-limiting embodiments or aspects, transaction service provider system 102, issuer system 104, and/or merchant system 108 may communicate an offer to user device 106 (e.g., the user associated with user device 106) based on the one or more predictions. In some non-limiting embodiments or aspects, transaction service provider system 102, issuer system 104, and/or merchant system 108 may communicate an offer to user device 106 based on transaction service provider system 102, issuer system 104, and/or merchant system 108 generating the offer. For example, transaction service provider system 102 may communicate an offer to merchant system 108 and merchant system 108 may communicate the offer to user device 106 based on receiving the offer from transaction service provider system 102.

In some non-limiting embodiments or aspects, transaction service provider system 102 may determine a location (e.g., a current location, a home address, a geographic area, a zip code, and/or the like) of user device 106 (e.g., the user associated with user device 106) based on the one or more predictions determined by transaction service provider system 102 based on the geographic area prediction model. For example, transaction service provider system 102 may determine location data associated with the location of the user associated with user device 106 based on the one or more predictions determined by transaction service provider system 102 using the geographic area prediction mode.

In some non-limiting embodiments or aspects, transaction service provider system 102 may generate an offer to be communicated to user device 106 (e.g., a user associated with user device 106) and/or a report to be communicated to issuer system 104 (e.g., an issuer institution associated with issuer system 104) and/or merchant system 108 (e.g., a merchant associated with merchant system 108) based on the location of user device 106. For example, transaction service provider system 102 may generate an offer to be communicated to a user (e.g., a user of the plurality of users for which a prediction score was generated) via user device 106 or a plurality of offers to be communicated to the user via user device 106 based on the location of user device 106. In another example, transaction service provider system 102 may generate a report to be communicated to issuer system 104 and/or merchant system 108 or a plurality of reports to be communicated to issuer system 104 and/or merchant system 108 based on the location of user device 106.

In some non-limiting embodiments or aspects, the offer may include a discount (e.g., a coupon, a monetary discount, and/or the like) to be applied to a payment transaction, a rewards parameter associated with a rewards program (e.g., a rewards program associated with an issuer institution, a rewards program associated with a merchant category that corresponds to the merchant category of the offer, a loyalty program associated with an issuer institution, a loyalty program associated with a merchant, and/or the like), a redemption offer associated with a merchant with a merchant category that corresponds to the merchant category of the offer (e.g., an offer associated with a user receiving a good or a service from the merchant when the user conducts a payment transaction involving the merchant), a repayment plan associated with a payment transaction, and/or the like.

Figure 3B:
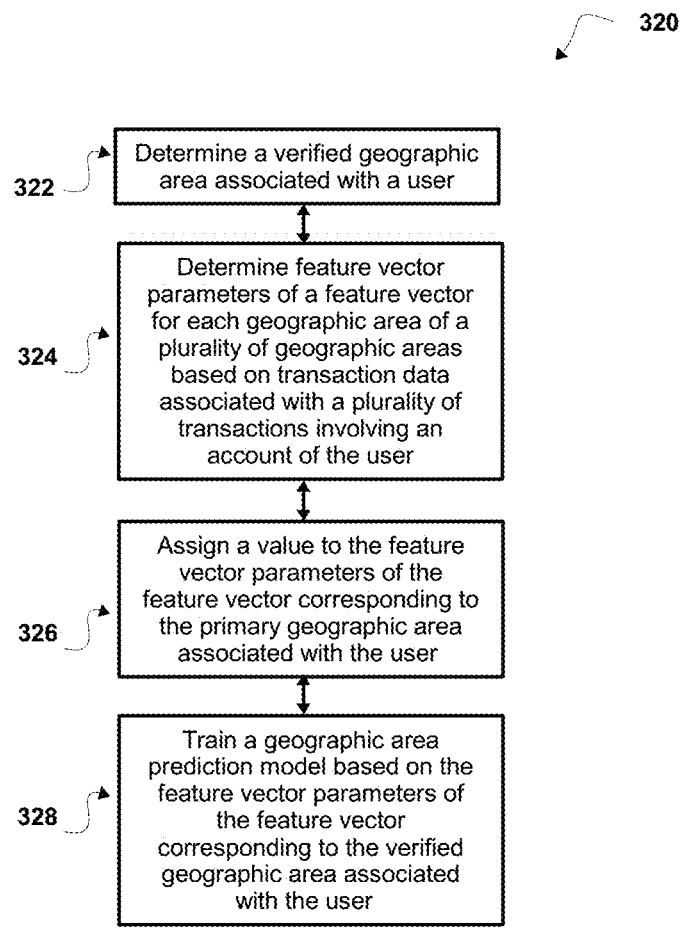
FIG. 3B is a flow diagram of a method for generating a geographic area prediction model, according to some non-limiting embodiments or aspects.

Referring now to FIG. 3B, shown is a flow diagram of a method for predicting a specified geographic area of a user, according to some non-limiting embodiments or aspects. In particular, FIG. 3B illustrates a process 320 for generating a geographic area prediction model. The steps of process 320, shown in FIG. 3B, are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step. In some non-limiting embodiments or aspects, one or more of the steps of process 320 may be performed (e.g., completely, partially, etc.) by transaction service provider system 102 (e.g., one or more devices of transaction service provider system 102). In some non-limiting embodiments or aspects, one or more of the steps of process 320 may be performed (e.g., completely, partially, etc.) by another device or a group of devices separate from or including transaction service provider system 102, such as issuer system 104 (e.g., one or more devices of issuer system 104), user device 106, or merchant system 108 (e.g., one or more devices of merchant system 108).

As shown in FIG. 3B, at step 322, process 320 may include determining a verified geographic area associated with a user. For example, transaction service provider system 102 may determine a verified geographic area (e.g., a zip code in which a user resides, a billing zip code associated with an account of a user, a credit card billing geographic area, a credit card billing zip code, and/or the like) associated with a user (e.g., a user associated with user device 106).

In some non-limiting embodiments or aspects, transaction service provider system 102 may determine a verified geographic area of a plurality of geographic areas for each user of a plurality of users. For example, transaction service provider system 102 may determine a geographic area of a plurality of geographic areas for each user of the plurality of users based on transaction data associated with a payment transaction involving a debit account of each user. Transaction service provider system 102 may assign the geographic area determined by transaction service provider system 102 as a verified geographic area for each user of the plurality of users based on determining the geographic area of the plurality of geographic areas.

As shown in FIG. 3B, at step 324, process 320 may include determining feature vector parameters of a feature vector for each geographic area of a plurality of geographic areas based on transaction data associated with a plurality of transactions involving an account of the user. For example, transaction service provider system 102 may determine feature vector parameters of a feature vector for each geographic area of a plurality of geographic areas based on transaction data associated with a plurality of transactions involving an account of the user. In some non-limiting embodiments or aspects, a feature vector may correspond to the account of a user and each feature vector parameter of the feature vector parameters may be associated with each geographic area of the plurality of geographic areas in which the plurality of geographic areas are geographic areas in which the user conducted a payment transaction involving the account of the user. In some non-limiting embodiments or aspects, the feature vector parameters may include a parameter associated with a maximum number of transactions involving a user in a maximum merchant category of a plurality of merchant categories (e.g., a merchant category of a plurality of merchant categories in which a user conducted a maximum number of payment transactions); a parameter associated with a transaction amount associated with the maximum number of transactions involving a user in the maximum merchant category of the plurality of merchant categories; a parameter associated with a time of day associated with the maximum number of transactions in the maximum merchant category of the plurality of merchant categories; a parameter associated with a day of a week associated with the maximum number of transactions in the maximum merchant category of the plurality of merchant categories; a parameter associated with a transaction amount associated with a plurality of transactions in the maximum merchant category in the plurality of geographic areas; a parameter associated with a transaction amount associated with a plurality of transactions in at least one of the following merchant categories: a merchant category associated with fuel, a merchant category associated with dry cleaning, a merchant category associated with laundry, a merchant category associated with mail, a merchant category associated with video rental, a merchant category associated with grocery, a merchant category associated with miscellaneous food sales, a merchant category associated with restaurant, and/or a merchant category associated with QSR; a parameter associated with a transaction amount associated with a plurality of transactions during a weekday of a week in a merchant category associated with restaurant, a merchant category associated with QSR, or any combination thereof; a parameter associated with a transaction amount associated with a plurality of transactions during a weekend day of a week in a merchant category associated with restaurant, and/or a merchant category associated with QSR (e.g., a parameter associated with a transaction amount associated with a plurality of transactions during a day of a week that occurs during a weekend instead of a weekday, in a merchant category associated with restaurant and/or a merchant category associated with QSR); a parameter associated with a time of day associated with at least one transaction in a merchant category of the plurality of merchant categories; a parameter associated with a day of a week associated with at least one transaction in a merchant category of the plurality of merchant categories; a parameter associated with a transaction amount associated with a plurality of transactions in each of the plurality of merchant categories in a geographic area; and/or a parameter associated with a transaction amount associated with a plurality of transactions in the plurality of merchant categories in a geographic area.

In some non-limiting embodiments or aspects, transaction service provider system 102 may identify a plurality of feature vector parameters associated with the verified geographic area for each user of the plurality of users and transaction service provider system 102 may exclude a plurality of feature vector parameters associated with each geographic area of the plurality of geographic areas that does not correspond to the verified geographic area.

In some non-limiting embodiments or aspects, transaction service provider system 102 may determine transaction data associated with a plurality of transactions involving each user of a plurality of users for each feature vector parameter of a plurality of feature vector parameters. In some non-limiting embodiments or aspects, transaction service provider system 102 may determine the transaction data based on determining each feature vector parameter of the plurality of feature vector parameters for each geographic area of the plurality of geographic areas.

In some non-limiting embodiments or aspects, transaction service provider system 102 may receive transaction data associated with a plurality of transactions involving a plurality of users and a plurality of merchants. For example, transaction service provider system 102 may receive transaction data associated with a plurality of transactions involving a plurality of users and a plurality of merchants during a predetermined time interval. In some non-limiting embodiments or aspects, the transaction data associated with the plurality of transactions includes credit card transaction data associated with a plurality of credit card payment transactions.

As shown in FIG. 3B, at step 326, process 320 may include assigning a value to the feature vector parameters of the feature vector corresponding to the verified geographic area associated with the user. For example, transaction service provider system 102 may assign a value to the feature vector parameters of the feature vector corresponding to the verified geographic area associated with the user. In some non-limiting embodiments or aspects, transaction service provider system 102 may assign a value equal to 1 for each feature vector parameter of the feature vector corresponding to the verified geographic area associated with the user. In some non-limiting embodiments or aspects, transaction service provider system 102 may assign a value equal to 0 for each feature vector parameter of the feature vector that does not correspond to the verified geographic area associated with the user.

As shown in FIG. 3B, at step 328, process 320 may include training a geographic area prediction model based on the feature vector parameters of the feature vector corresponding to the verified geographic area associated with the user. For example, transaction service provider system 102 may train a geographic area prediction model based on the feature vector parameters of the feature vector corresponding to the verified geographic area associated with the user. In some non-limiting embodiments or aspects, transaction service provider system 102 may train the geographic area prediction model based on the feature vector parameters of the feature vector that are assigned a value of 1. In some non-limiting embodiments or aspects, transaction service provider system 102 may forego training the geographic area prediction model based on the feature vector parameters of the feature vector that are assigned a value of 0. In some non-limiting embodiments or aspects, transaction service provider system 102 may validate the geographic area prediction model based on the feature vector parameters of the feature vector. For example, transaction service provider system 102 may validate the geographic area prediction model based on the feature vector parameters of the feature vector corresponding to the verified geographic area associated with the user.

In some non-limiting embodiments or aspects, transaction service provider system 102 may train the geographic area prediction model based on the plurality of feature vector parameters for the verified geographic area. For example, transaction service provider system 102 may train the geographic area prediction model based on the plurality of feature vector parameters for the verified geographic area for each user of the plurality of users. In some non-limiting embodiments or aspects, transaction service provider system 102 may validate the geographic area prediction model based on the plurality of feature vector parameters for the verified geographic area for each user of the plurality of users.

In some non-limiting embodiments or aspects, transaction service provider system 102 may receive first transaction data associated with a plurality of first transactions involving a first user of the plurality of users, determine a plurality of feature vector parameters for each geographic area of the plurality of geographic areas based on the first transaction data associated with the plurality of first transactions, and, based on the geographic area prediction model and the plurality of feature vector parameters for the verified geographic area of the first user, assign a predicted geographic area to the first user. In some non-limiting embodiments or aspects, transaction service provider system 102 may assign the predicted geographic area of the first user to a debit account associated with the first user.

In some non-limiting embodiments or aspects, transaction service provider system 102 may determine, based on the first transaction data associated with a plurality of first transactions involving the first user, second transaction data associated with a second plurality of transactions involving the first user and a first plurality of merchants of the plurality of merchants in the predicted geographic area of the first user. Additionally or alternatively, transaction service provider system 102 may determine a geographic location of the first user in the predicted geographic area of the first user associated with a position of the first plurality of merchants based on the second transaction data associated with the second plurality of transactions. In some non-limiting embodiments or aspects, the geographic location of the first user in the predicted geographic area of the first user is associated with at least one geographic coordinate, wherein the at least one geographic coordinate comprises a latitude coordinate, a longitude coordinate, or any combination thereof.

In some non-limiting embodiments or aspects, transaction service provider system 102 may determine a geographic location of each of the first plurality of merchants, where the geographic location of the user in the predicted geographic area of the user corresponds to a central position associated with the position of the first plurality of merchants.

Figure 4:
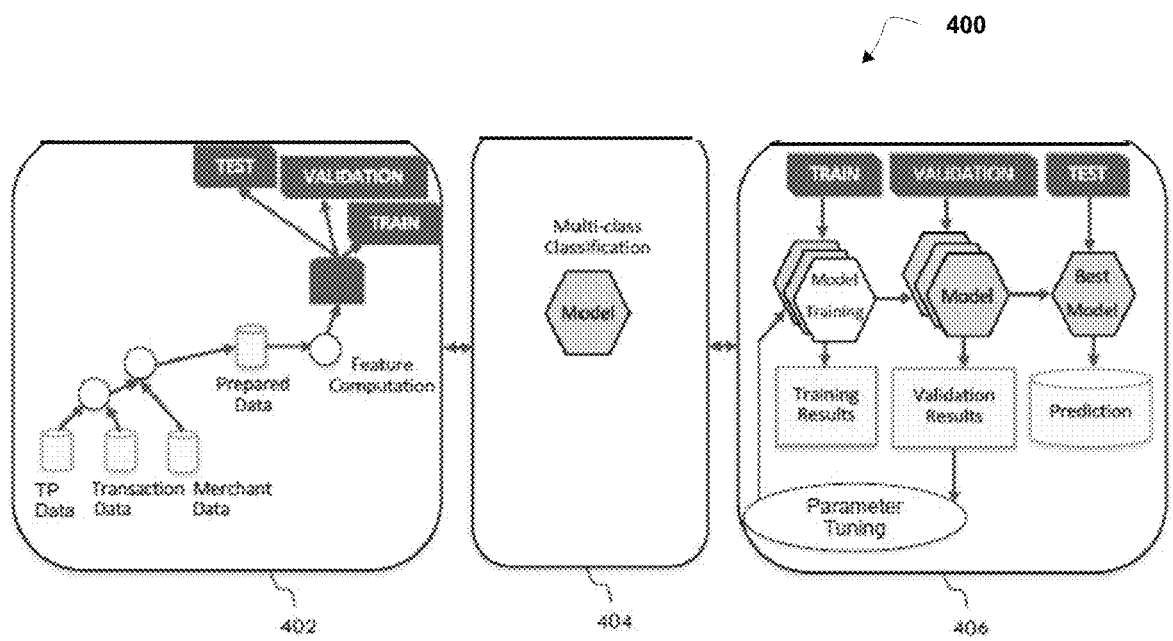
FIG. 4 is a schematic diagram of a geographic area prediction model process, according to some non-limiting embodiments or aspects.

Referring now to FIG. 4, shown is a schematic diagram of a method for predicting a specified geographic area of a user, according to some non-limiting embodiments or aspects. In particular, FIG. 4 illustrates a process 400 for predicting the geographic area of a user. As shown in FIG. 4, at step 402, process 400 may include a data preparation phase. The input of this phase is data from one or more transaction service provider databases, the data including financial device holders' transaction activity data, merchant data, and financial device holder data. The data is joined into a training matrix that may be used to test and train the predictive model. The input-to-output conversion, and format of the training matrix, is further detailed below with regard to steps 404 and 406 of process 400, and with reference to FIG. 5.

As shown in FIG. 4, at step 404, process 400 may include generating a geographic area prediction model. The geographic area prediction model may be configured as a supervised multi-class classification model. The geographic area prediction model may be designed to classify instances (e.g., instances associated with an account holder's transactions, instances associated with credit cardholder accounts, and/or the like) into one of the more than two classes where the total number of classes k is less than the total number of geographic areas (e.g., the total number of zip codes in the United States). In some non-limiting embodiments or aspects, each training instance represents an account holder's transactions, aggregated into a single feature vector, over a period of time. Each training instance may be associated with a set of class labels. In some non-limiting embodiments or aspects, k classes may be defined to correspond to the k merchant geographic areas where the account holder transacted during that period. Where the geographic area as a class is a zip code in the United States, for example, k may be much less than 44,000, since there are fewer than 44,000 viable zip codes in the United States, and an account holder is likely to transact in only a small portion thereof. The top merchant geographic areas for an account holder may be defined as the merchant geographic areas where the account holder transacted the most during that period. A merchant geographic area (e.g., a geographic area in which a location of a merchant is located), such as a class, is set to 1 if the merchant geographic area is the same as the account holder's geographic area, and 0 if otherwise. For example, if the merchant zip code matches the account holder's billing zip code, the class is set as 1. Thus, an account holder, e.g., a training instance, can have at most one class (out of k classes) set to 1.

Regarding the geographic area prediction model, the feature vector aggregates an account holder's transactions during the period and includes k components corresponding to the k classes, e.g., geographic areas. Each of the k component features contains information relevant to the account holder's transactions in a particular geographic area. The individual attributes in each of the k component features corresponding to the k geographic areas are: (i) category in which the account holder transacted the most; (ii) amount of money transacted in that category; (iii) time of the day when most of the transactions in that category were made; (iv) day of the week when most of the transactions in that category were made; (v) total amount of money transacted in that category over all geographic areas; (vi) amount of money transacted in the merchant category of "Gas;" (vii) amount of money transacted in the categories "Dry Clean" and "Laundry;" (viii) amount of money transacted in the category "Mail Post;" (ix) amount of money transacted in the category "DVD Rental;" (x) amount of money transacted in the categories "Grocery" and "Misc. Food Stores;" (xi) amount of money transacted in the categories "Restaurant" and "Fast Food" during the weekend; (xii) amount of money transacted in the categories "Restaurant" and "Fast Food" during a weekday; and/or (xiii) total amount of money transacted in that geographic area over all categories. The features are related to activities account holders are likely to do near their homes.

As shown in FIG. 4, at step 406, process 400 may include training, validating, and testing the geographic area prediction model based on transaction data associated with a plurality of transactions. For example, transaction service provider system 102 may train, validate, and test the geographic area prediction model based on transaction data associated with a plurality of transactions. In some non-limiting embodiments or aspects, step 406 of process 400 may be the same or similar to steps 304 and 306 of process 300 described above.

Figure 5:
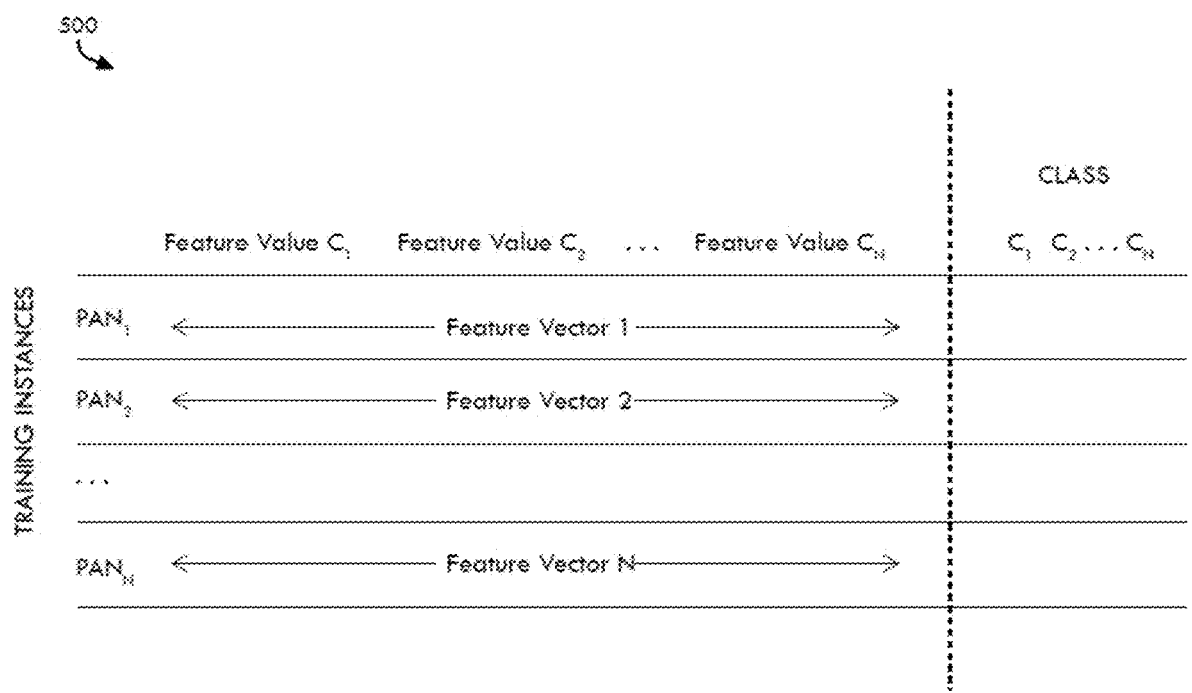
FIG. 5 is a schematic diagram of a training structure for a geographic area prediction model, according to some non-limiting embodiments or aspects.

Referring to FIG. 5, shown is a schematic diagram of a method for predicting a specified geographic area of a user, according to some non-limiting embodiments or aspects. In particular, FIG. 5 provides a non-limiting example of a training matrix 500 for a training set for a geographic area prediction model. For each training instance (e.g., an instance associated with a cardholder account), the feature vector is of length j·k, where j is the number of features and k is the number of classes. Out of the k classes, e.g., the top merchant geographic areas, the geographic area that matches the account holder's billing geographic area is set to 1 while the rest are set to 0. The matrix dimension is n·(j·k+k), where n is the total number of training instances and k is the total number of classes. In the above-provided example list of features, the matrix dimension is n·(13k+k).

With further reference to FIG. 5, provided below is a non-limiting example of creating a training matrix using the depicted structure, with non-limiting exemplary data based on four hypothetical financial device holders. Each financial device holder corresponds to a training instance and are depicted in Table 1 as rows FDH1 to FDH4. There are two classes (C1 and C2) depicted in the exemplary training matrix, representative of the top two geographic areas (e.g., zip codes) where the financial device holders transacted. Any number of classes may be selected, but it may be desirable to take a top portion of all classes, as shown, to promote efficiency and reduce processing time. For example, there are fewer than 44,000 zip codes in the United States, but the sample financial device holders are likely to transact in only a fraction of those zip codes, so the top portion of those zip codes may be analyzed and selected as the training classes (the far-right columns). A class column (C1, C2) cell may have the value of 1 if it is the geographic area where the financial device holder lives. Otherwise, it may be set to 0. Each column to the left of the class columns contains a corresponding attribute value of an evaluated feature (F1, F2, etc.) for a given class (C1, C2). In the example shown below, there are thirteen features evaluated over two classes (spanning F1 C1 to F13 C2), so there would be twenty-six feature-class columns. Each row of Table 1 spanning the feature-class columns represents a feature vector (values of F1 C1 to F13 C2) for a given training instance (FDH1, FDH2, etc.). The numbers shown below are for illustrative example only, and depend on the chosen features to evaluate. The feature values may be categorical (e.g., binary) or quantitative (e.g., float, integer, decimal, etc.).

TABLE 1

|      | F1 C1 | F2 C1 | ... | F13 C1 | F1 C2 | F2 C2 | ... | F13 C2 | C1 | C2 |
|------|-------|-------|-----|--------|-------|-------|-----|--------|----|----|
| FDH1 | 0.1   | 5.5   | ... | 1      | 0.3   | 7.9   | ... | 0      | 1  | 0  |
| FDH2 | 0.3   | 4.3   | ... | 1      | 0.2   | 2.3   | ... | 1      | 1  | 0  |
| FDH3 | 0.66  | 1.3   | ... | 0      | 0.1   | 2.6   | ... | 0      | 0  | 0  |
| FDH4 | 0.56  | 0.7   | ... | 0      | 0.9   | 5.5   | ... | 1      | 0  | 1  |

In some non-limiting embodiments or aspects, once the training matrix 500 is constructed, a Gradient Boosted Tree (GBT) Classifier may be selected to train the geographic area prediction model. The GBT Classifier may be used to build an additive model in a forward stage-wise fashion. The GBT Classifier allows for the optimization of arbitrary differentiable loss functions. In each stage, k regression trees are fit on the negative gradient of the multinomial deviance loss function.

In some non-limiting embodiments or aspects, given $\{(x_1, y_1), (x_2, y_2), \ldots (x_n, y_n)\}$, and the goal to fit a model $\hat{y} \approx F(x)$ minimizing loss function L (y, F(x)), the model is updated at iteration m as the following relationship:

Formula 1

$$F_m(x) = F_{m-1}(x) + \Sigma_{j=1 \text{ to } J_m}\left(\frac{\gamma_{jm}}{x \in R_{jm}}\right), \text{ where}$$

$$\gamma_{jm} = \operatorname{argmin} \Sigma_{x_i \in R_{jm}} L(y_i, F_{m-1}(x_i) + \gamma),$$

where i is the indicator notation, $j_m$ is the number of disjoint regions (e.g., leaves), and $\{R_{1m}, R_{2m}, \ldots, \gamma_{jm}\}$ is the optimal value per region while y is the constant value with which the model is initialized.

Figure 6:
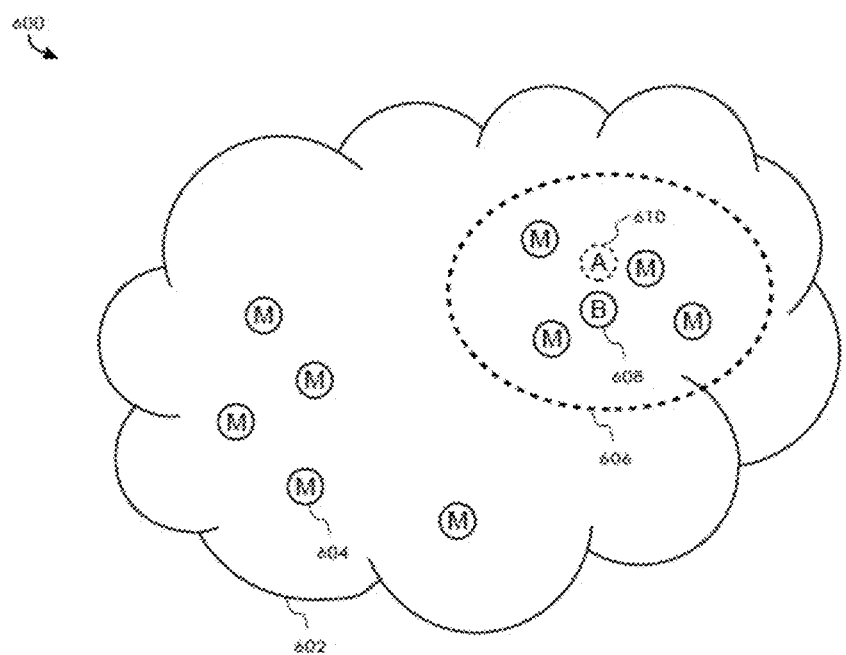
FIG. 6 is a schematic diagram of latitude and longitude information estimation, according to some non-limiting embodiments or aspects.

With reference to FIG. 6, provided are some non-limiting embodiments or aspects of a process 600 for determining latitude and longitude information associated with a location of a user. In some non-limiting embodiments or aspects, the geographic area prediction model may be used to estimate an account holder's latitude and longitude information. For example, given that the geographic area prediction model has predicted an account holder's geographic area 606 (e.g., a billing zip code), all transactions 602 made by the account holder at the predicted geographic area are selected and the associated merchants' 604 latitude-longitude information is determined. A centroid of the bounded region 606 is determined and is assigned as the account holder's billing address (e.g., the account holder's billing address based on latitude and longitude information), marked as predicted address 608. Shown is an actual address of the account holder 610, for comparison.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system comprising:
at least one processor configured to:
determine, for each user of a plurality of users, a verified geographic area associated with the user;
determine, for each user of the plurality of users, a feature vector associated with an account of the user, each parameter of the feature vector associated with a value based on a maximum number of transactions conducted by the user with the account in a geographic area of a plurality of geographic areas;
receive transaction data associated with a plurality of transactions involving each user of the plurality of users;
determine a value of each parameter of the feature vector for each user of the plurality of users based on the transaction data to produce a training matrix, wherein each row of the training matrix comprises values of a feature vector associated with a user of the plurality of users;
train a geographic area prediction model based on the training matrix;
validate the geographic area prediction model based on the training matrix;
repeatedly generate a prediction that a user will conduct a transaction in a geographic area based on the geographic area prediction model;
repeatedly communicate an offer to the user based on the prediction;
repeatedly receive new training data by processing a transaction conducted by the user in the geographic area within a predetermined amount of time from the offer being communicated to the user; and
repeatedly update the geographic area prediction model based on the new training data.

2. The system of claim 1, wherein, when determining the feature vector for each user of the plurality of users, the at least one processor is configured to:
identify a plurality of feature vector parameters associated with the verified geographic area for the user; and exclude a plurality of feature vector parameters associated with each geographic area of the plurality of geographic areas that does not correspond to the verified geographic area.

3. The system of claim 1, wherein the at least one processor is further configured to:
receive first transaction data associated with a plurality of first transactions involving a first user of the plurality of users;
determine a plurality of feature vector parameters for each geographic area of the plurality of geographic areas based on the first transaction data associated with the plurality of first transactions; and
based on the geographic area prediction model and the plurality of feature vector parameters for the verified geographic area of the first user, assign a predicted geographic area to the first user.

4. The system of claim 3, wherein the at least one processor is further configured to assign the predicted geographic area of the first user to a debit account associated with the first user.

5. The system of claim 3, wherein the at least one processor is further configured to:
determine second transaction data associated with a second plurality of transactions involving the first user and a plurality of merchants in the predicted geographic area of the first user; and
determine a geographic location of the first user in the predicted geographic area of the first user associated with a position of the plurality of merchants, based on the second transaction data associated with the second plurality of transactions.

6. The system of claim 5, wherein the geographic location of the first user in the predicted geographic area of the first user is associated with at least one geographic coordinate, and wherein the at least one geographic coordinate comprises a latitude coordinate, a longitude coordinate, or any combination thereof.

7. The system of claim 5, wherein the at least one processor is further configured to determine a geographic location of each of the plurality of merchants, and wherein the geographic location of the user in the predicted geographic area of the user corresponds to a central position associated with the position of the plurality of merchants.

8. A method, comprising:
determining, with at least one processor, for each user of a plurality of users, a verified geographic area associated with the user;
determining, with at least one processor, for each user of the plurality of users, a feature vector associated with an account of the user, each parameter of the feature vector associated with a value based on a maximum number of transactions conducted by the user with the account in a geographic area of a plurality of geographic areas;
receiving, with at least one processor, transaction data associated with a plurality of transactions involving each user of the plurality of users;
determining, with at least one processor, a value of each parameter of the feature vector for each user of the plurality of users based on the transaction data to produce a training matrix, wherein each row of the training matrix comprises values of a feature vector associated with a user of the plurality of users;
training, with at least one processor, a geographic area prediction model based on the training matrix;
validating, with at least one processor, the geographic area prediction model based on the training matrix;
repeatedly generating, with at least one processor, a prediction that a user will conduct a transaction in a geographic area based on the geographic area prediction model;
repeatedly communicating, with at least one processor, an offer to the user based on the prediction;
repeatedly receiving, with at least one processor, new training data by processing a transaction conducted by the user in the geographic area within a predetermined amount of time from the offer being communicated to the user; and
repeatedly updating, with at least one processor, the geographic area prediction model based on the new training data.

9. The method of claim 8, wherein determining the feature vector for each user of the plurality of users comprises:
identifying a plurality of feature vector parameters associated with the verified geographic area for the user; and
excluding a plurality of feature vector parameters associated with each geographic area of the plurality of geographic areas that does not correspond to the verified geographic area.

10. The method of claim 8, further comprising:
receiving, with at least one processor, first transaction data associated with a plurality of first transactions involving a first user of the plurality of users;
determining, with at least one processor, a plurality of feature vector parameters for each geographic area of the plurality of geographic areas based on the first transaction data associated with the plurality of first transactions; and
based on the geographic area prediction model and the plurality of feature vector parameters for the verified geographic area of the first user, assigning, with at least one processor, a predicted geographic area to the first user.

11. The method of claim 10, further comprising assigning, with at least one processor, the predicted geographic area of the first user to a debit account associated with the first user.

12. The method of claim 11, further comprising:
determining, with at least one processor, second transaction data associated with a second plurality of transactions involving the first user and a plurality of merchants in the predicted geographic area of the first user; and
determining, with at least one processor, a geographic location of the first user in the predicted geographic area of the first user associated with a position of the plurality of merchants, based on the second transaction data associated with the second plurality of transactions.

13. The method of claim 12, wherein the geographic location of the first user in the predicted geographic area of the first user is associated with at least one geographic coordinate, and wherein the at least one geographic coordinate comprises a latitude coordinate, a longitude coordinate, or any combination thereof.

14. The method of claim 12, further comprising determining, with at least one processor, a geographic location of each of the plurality of merchants, wherein the geographic location of the user in the predicted geographic area of the user corresponds to a central position associated with the position of the plurality of merchants.

15. A computer program product comprising at least one non-transitory computer-readable medium including program instructions that, when executed by at least one processor, cause the at least one processor to:
    determine, for each user of a plurality of users, a verified geographic area associated with the user;
    determine, for each user of the plurality of users, a feature vector associated with an account of the user, each parameter of the feature vector associated with a value based on a maximum number of transactions conducted by the user with the account in a geographic area of a plurality of geographic areas;
    receive transaction data associated with a plurality of transactions involving each user of the plurality of users;
    determine a value of each parameter of the feature vector for each user of the plurality of users based on the transaction data to produce a training matrix, wherein each row of the training matrix comprises values of a feature vector associated with a user of the plurality of users;
    train a geographic area prediction model based on the training matrix;
    validate the geographic area prediction model based on the training matrix;
    repeatedly generate a prediction that a user will conduct a transaction in a geographic area based on the geographic area prediction model;
    repeatedly communicate an offer to the user based on the prediction;
    repeatedly receive new training data by processing a transaction conducted by the user in the geographic area within a predetermined amount of time from the offer being communicated to the user; and
    repeatedly update the geographic area prediction model based on the new training data.

16. The computer program product of claim 15, wherein the program instructions that cause the at least one processor to determine the feature vector for each user of the plurality of users cause the at least one processor to:
    identify a plurality of feature vector parameters associated with the verified geographic area for the user; and
    exclude a plurality of feature vector parameters associated with each geographic area of the plurality of geographic areas that does not correspond to the verified geographic area.

17. The computer program product of claim 15, wherein the program instructions further cause the at least one processor to:
    receive first transaction data associated with a plurality of first transactions involving a first user of the plurality of users;
    determine a plurality of feature vector parameters for each geographic area of the plurality of geographic areas based on the first transaction data associated with the plurality of first transactions; and
    based on the geographic area prediction model and the plurality of feature vector parameters for the verified geographic area of the first user, assign a predicted geographic area to the first user.

18. The computer program product of claim 17, wherein the program instructions further cause the at least one processor to:
    determine second transaction data associated with a second plurality of transactions involving the first user and a plurality of merchants in the predicted geographic area of the first user; and
    determine a geographic location of the first user in the predicted geographic area of the first user associated with a position of the plurality of merchants, based on the second transaction data associated with the second plurality of transactions.

19. The computer program product of claim 18, wherein the geographic location of the first user in the predicted geographic area of the first user is associated with at least one geographic coordinate, and wherein the at least one geographic coordinate comprises a latitude coordinate, a longitude coordinate, or any combination thereof.

20. The computer program product of claim 18, wherein the program instructions further cause the at least one processor to determine a geographic location of each of the plurality of merchants, and wherein the geographic location of the user in the predicted geographic area of the user corresponds to a central position associated with the position of the plurality of merchants.

* * * * *